United States Patent
Martin

(10) Patent No.: US 9,059,892 B2
(45) Date of Patent: Jun. 16, 2015

(54) ROUTING IN A COMMUNICATIONS NETWORK USING CONTEXTUAL INFORMATION

(71) Applicant: RADIUS NETWORKS INC., Washington, DC (US)

(72) Inventor: David P. Martin, Chantilly, VA (US)

(73) Assignee: RADIUS NETWORKS INC., Washington, DC (US)

( * ) Notice: Subject to any disclaimer, the term of this patent is extended or adjusted under 35 U.S.C. 154(b) by 233 days.

(21) Appl. No.: 13/872,432

(22) Filed: Apr. 29, 2013

(65) Prior Publication Data

US 2013/0238814 A1 Sep. 12, 2013

Related U.S. Application Data

(63) Continuation of application No. 12/142,612, filed on Jun. 19, 2008, now Pat. No. 8,452,891.

(51) Int. Cl.
| | | |
|---|---|---|
| *H04L 29/08* | (2006.01) | |
| *H04L 12/701* | (2013.01) | |
| *G06F 9/54* | (2006.01) | |

(Continued)

(52) U.S. Cl.
CPC .............. *H04L 45/00* (2013.01); *H04L 67/322* (2013.01); *H04L 67/2823* (2013.01); *G06F 9/54* (2013.01); *H04L 45/02* (2013.01); *H04L 45/302* (2013.01); *H04L 45/306* (2013.01);
(Continued)

(58) Field of Classification Search
CPC ................. H04L 45/00; H04L 45/02–45/021; H04L 45/12–45/127; H04L 45/20; H04L 45/302; H04L 45/306; H04L 45/3065; H04L 45/70; H04L 67/00; H04L 67/2514; H04L 67/2819; H04L 67/2823; H04L 67/32; H04L 67/322; H04L 67/327; H04L 61/10; H04L 61/106; H04L 61/25–61/2517
USPC ......... 709/207, 217–218, 227–228, 230–231, 709/236, 238, 240, 245–246, 250; 340/2.1, 340/2.23; 370/465–467; 379/219–221.01; 708/204

See application file for complete search history.

(56) References Cited

U.S. PATENT DOCUMENTS 5,694,545 A * 12/1997 Roskowski et al. ........... 709/231
5,954,797 A    9/1999 Sidey (Continued)

OTHER PUBLICATIONS

PCT International Search Report and Written Opinion, PCT/US2009/047282, Aug. 19, 2009, pp. 1-12.

*Primary Examiner* — Saleh Najjar
*Assistant Examiner* — Eric W Shepperd
(74) *Attorney, Agent, or Firm* — Vierra Magen Marcus LLP

(57) ABSTRACT

A generic address resolution system facilitates communications among multiple network applications with heterogeneous addressing mechanisms, thereby allowing the network applications to interoperate with each other and/or with modules for providing enhanced functionalities. The address resolution system includes a resource mapping module that modularizes the components needed for address resolution and abstracts content from the underlying address types and content used by the network applications. The address resolution system includes a context engine that analyzes the addressing data to be resolved, selects one or more appropriate destination network applications based on contextual rules, and creates the application mapping template for the end-end routing of the communications among the network applications.

20 Claims, 6 Drawing Sheets

(51) Int. Cl.
*H04L 12/751* (2013.01)
*H04L 12/725* (2013.01)
*H04L 29/12* (2006.01)

(52) U.S. Cl.
CPC ......... *H04L 45/3065* (2013.01); *H04L 61/106* (2013.01); *H04L 67/327* (2013.01)

(56) References Cited

U.S. PATENT DOCUMENTS

| | | | |
|---|---|---|---|
| 6,269,153 B1 * | 7/2001 | Carpenter et al. | 379/88.02 |
| 6,298,057 B1 | 10/2001 | Guy et al. | |
| 6,370,399 B1 | 4/2002 | Phillips | |
| 6,411,685 B1 | 6/2002 | O'Neal | |
| 7,065,367 B2 | 6/2006 | Michaelis et al. | |
| 7,110,359 B1 | 9/2006 | Acharya | |
| 7,251,637 B1 | 7/2007 | Caid et al. | |
| 7,280,535 B1 | 10/2007 | Bergman et al. | |
| 7,370,276 B2 | 5/2008 | Willis | |
| 7,599,957 B2 | 10/2009 | Liu et al. | |
| 7,876,748 B1 * | 1/2011 | Conner et al. | 370/389 |
| 7,908,222 B2 | 3/2011 | Grandcolas et al. | |
| 8,176,386 B1 * | 5/2012 | Sutardja et al. | 714/763 |
| 2002/0044531 A1 * | 4/2002 | Cooper et al. | 370/248 |
| 2002/0071444 A1 | 6/2002 | Aschir | |
| 2002/0078381 A1 | 6/2002 | Farley et al. | |
| 2003/0120665 A1 | 6/2003 | Fox et al. | |
| 2004/0125815 A1 * | 7/2004 | Shimazu et al. | 370/411 |
| 2004/0203944 A1 | 10/2004 | Huomo et al. | |
| 2004/0260750 A1 * | 12/2004 | Ruutu et al. | 709/200 |
| 2005/0259648 A1 * | 11/2005 | Kodialam et al. | 370/389 |
| 2005/0281271 A1 | 12/2005 | Beshai et al. | 370/400 |
| 2007/0028001 A1 * | 2/2007 | Phillips et al. | 709/238 |
| 2007/0086482 A1 | 4/2007 | Pruzan et al. | |
| 2007/0094042 A1 | 4/2007 | Ramer et al. | |
| 2007/0230443 A1 | 10/2007 | Milstein et al. | |
| 2008/0082684 A1 | 4/2008 | Gaos et al. | |
| 2009/0046712 A1 * | 2/2009 | Nordmark et al. | 370/389 |
| 2009/0292824 A1 * | 11/2009 | Marashi et al. | 709/247 |

* cited by examiner

ROUTING IN A COMMUNICATIONS NETWORK USING CONTEXTUAL INFORMATION

CROSS REFERENCE TO RELATED APPLICATIONS

This application is a continuation of U.S. application Ser. No. 12/142,612, filed Jun. 19, 2008, which is incorporated by reference in its entirety.

BACKGROUND

This invention relates generally to communications systems, and in particular to providing interoperability and end-to-end routing capability for network applications in a communications environment.

Many different network applications provide various services for mobile communications subscribers, including voice, data, text messaging, push-to-talk (PTT), along with many other types of services. These network applications are usually designed independently of each other and often by different entities, so they commonly use proprietary data formats and their own protocols. Because of the resulting incompatibilities, these different network applications rarely interoperate. One major issue in a system that allows network applications to interoperate is that an originating application's application domain does not necessarily correspond to its destination's application domain. These different application domains often use different addressing mechanisms, e.g., email addressing mechanism and telephone numbers.

For example, an interoperating system connects a Private Branch Exchange (PBX) system to a Public Switched Telephone Network (PSTN) and an email system. The interoperating system receives a telephone call from the PBX addressed to a telephone number. The interoperating system needs to decide whether to route that call to the PSTN, to translate the call to text and deliver it via email, or to do both. To make this decision, the interoperating system must appropriately use the originating application's metadata to determine all available applications to which it can be routed, and then leverage contextual information and determine the appropriate routing to one or more destination network applications.

To solve the problem of interoperation between network applications with heterogeneous addressing types, existing interoperating systems, such as Short Message Service-Instant Messaging interoperating system among different wireless operators, or Land Mobile Radio interoperating with commercial PTT systems, have developed specialized addressing mechanisms that resolve the addressing of communicating network applications. Some of these mechanisms employee a common addressing mechanism that forces an addressing requirement on one or more of the communicating network applications. However, this mechanism requires modification of communicating network applications to adapt to the required common addressing. Thus, such an interoperating system is not scalable for dynamically interoperating many network applications.

Another conventional solution creates a fixed binding between different addressing types for the interoperation of the communicating network applications. This solution requires maintaining the addressing state between the communicating network applications in the interoperating system. Thus, this mechanism essentially "hardwires" an address resolution between two network applications. Consequently, such interoperating system does not scalable well either for dynamically interoperating many applications.

SUMMARY

Rather than require a fixed binding or a common addressing between network applications with different addressing types, as in the conventional approaches, embodiments of the invention allow interoperability among multiple network applications by resolving the addressing used by the network applications into a generic address resolution framework. The address resolution framework modularizes the components needed for addressing resolution and abstracts data and content from the network applications. By exposing the data and content used by the network applications, the address resolution framework enables various network applications to share the data so that it can be used by the other applications. This allows the network applications to interoperate, and it also allows the functionalities of particular network applications to be enhanced without requiring the network applications themselves to be modified.

In one embodiment, the generic address resolution framework includes a resource mapping module that provides connectivity between the address resolution framework and the external network applications via an application switching engine and various resource adapters. The resource adapters extract the content or data used by the corresponding network application, tag the data, and provide the data into a shared resource repository via the resource mapping module. The application switching engine enables the end-to-end communications between two network applications based on the routing information provided by the address resolution framework. In this way, metadata used by each network application are stored in the address resolution framework, where the resource mapping module handles the sharing of the shared resources among the network applications as needed for address resolution.

The generic address resolution framework may also include a context engine that resolves and routes an incoming service request based on the address type and address content of the destination address provided by the underline network application. The incoming service request is a transmission, which may be a message (e.g., in a packet-based system) or any other type of transmission. In one embodiment, the context engine uses an address type resolution module and an address content resolution module in parallel to analyze the addressing data of the destination address. The result of this analysis is a list of routable network applications that matches the address type and content of the destination address. A content destination selection module of the context engine selects one or more appropriate destination network applications from the list of routable applications based on a set of contextual rules and policies. The context engine then creates an application mapping template that describes the end-to-end routing instructions based on the destination network applications selection.

BRIEF DESCRIPTION OF THE DRAWINGS

Embodiments of the invention will be described below with reference to the accompanying drawings. Like reference numerals are used for like elements in the accompanying drawings.

DETAILED DESCRIPTION

Overview of Generic Address Resolution Framework

Figure 1:
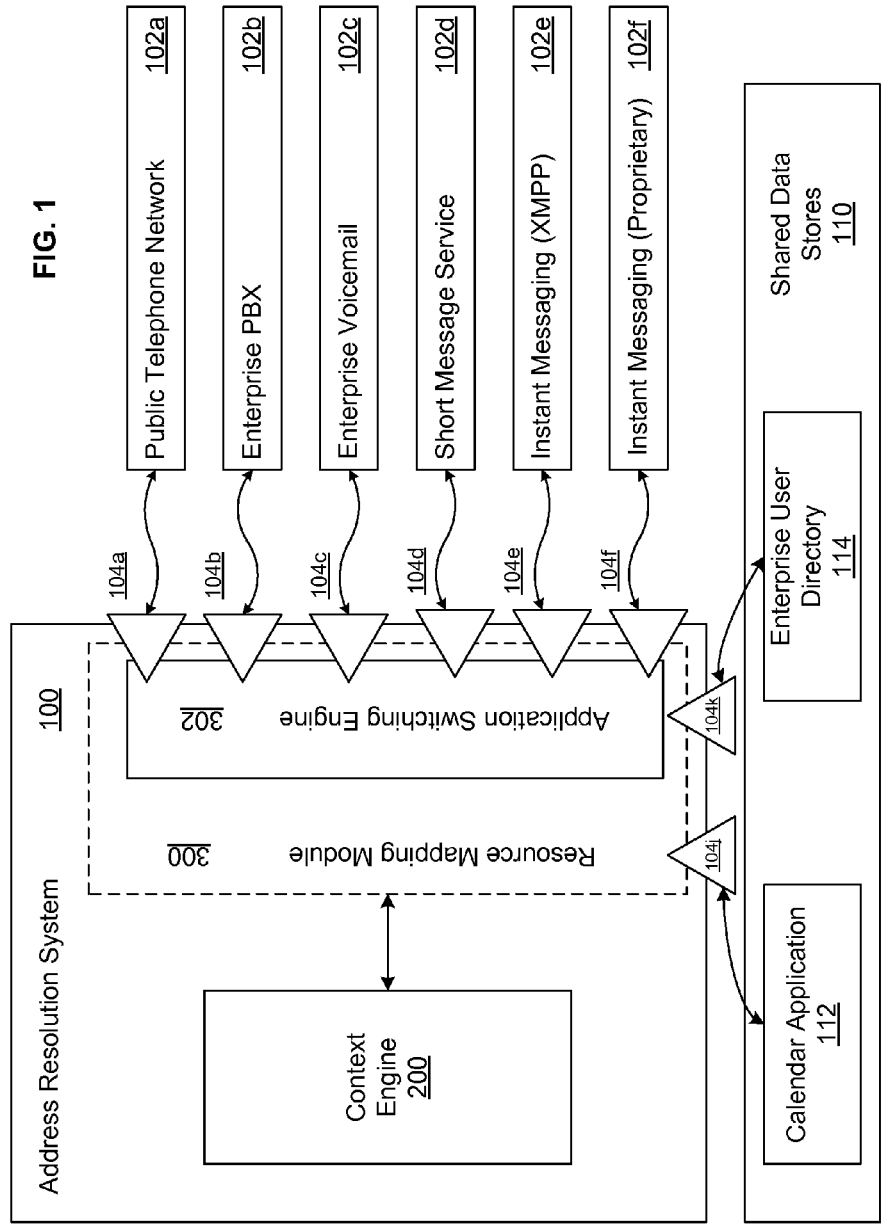
FIG. 1 is a schematic drawing of an addressing resolution system that facilitates communications between network applications with different addressing mechanisms, in accordance with an embodiment of the invention.

FIG. 1 illustrates a schematic drawing of an addressing resolution system 100 for facilitating communications among network applications with different addressing mechanisms, in accordance with an embodiment of the invention. Specifically, the address resolution system 100 acts as a bridge between an Enterprise PBX 102b and an external phone system, i.e., Public Telephone Network 102a, while integrating with other enterprise applications and data, such as Enterprise Voicemail system 102c, Short Message Service (SMS) 102d, open standard Instant Messaging (XMPP) 102e, proprietary Instant Messaging 102f, as well as enterprise data stores 110, such as an Enterprise User Dictionary 114 and a Calendar Application 112 with scheduling information for users and resources.

The address resolution system 100 shown in FIG. 1 includes a context engine 200 and a resource mapping module 300. The context engine 200 resolves and routes the incoming service requests into the system 100 to appropriate receiving network application(s). The resource mapping module 300 provides connectivity to external network applications that reside outside the resolution system 100 and communicates with the system 100. Connectivity to the external network applications is via an application switching engine 302 and resource adapters (e.g., 104a-104f). In addition, the resource mapping module 300 provides federated access to shared data at the shared data store 110.

In the system shown, one or more network applications (e.g., 102a-102f) may communicate with the address resolution system 100 through one or more resource adapters (e.g., 104a-104f). The various network applications may be configured for use with the same or with different platforms (e.g., cellular phones, personal computers, or any other devices capable of electronic communication). Network applications may comprise code, logic, and combinations thereof, and they may reside on one or more systems in a communications network infrastructure. A network application performs communications functionalities that implement a service on a communications network. As shown in FIG. 1, various network applications 102 communicate with each other through the resource adapters 104; however, the applications 102 may be able to communicate with each other in peer-to-peer fashion or through applications servers.

An incoming service request originated from an external network application, such as the Public Telephone Network 102a in FIG. 1, has a plurality of application metadata associated with the service request. An incoming service request is a transmission, which may be a message (e.g., in a packet-based system) or any other type of transmission. In the context of the invention from herein, the external network application from which the incoming service request is originated is referred to as "an originating network application" for the simplicity of the description of an embodiment of the invention. In one embodiment, a service request contains a destination address (e.g., destination address type and address content), which is normally in a format compatible with the originating network application's application domain. The service request may also contain metadata about the originating network application, such as the address type of the originating network application and/or application specific parameters (e.g., the device and network capacities associated with the originating network application)

The service request entering the address resolution system 100 may also contain network application mapping templates that explicitly instruct the address resolution system 100 how to route the content of the originating network applications. For example, an application template explicitly instructs the address resolution system 100 to route a public telephone call directly to a desk phone, while another application template directs the system 100 to route the public telephone call to a voice mail and a SMS. The application mapping template associated with an incoming service request is stored by the resource adapter 104 associated with the originating network application in the shared data stores 110 at the direction of the resource mapping module 300. The application mapping templates are retrievable by metadata indices during address resolution process by the context engine 200. If no application mapping templates are available for the address resolution for the provided metadata, the context engine 200 creates context-based dynamic application mapping templates within the address resolution process. The details of context-based dynamic mapping template creation are presented in connection with the discussions of FIGS. 2-4.

Embodiments of the invention include one or more resource adapters 104 for each network application. Although the resource adapters 104 are shown as a single functional block, they may be implemented in any combination of modules or as a single module running on the same system. The resource adapters 104 may physically reside on any hardware in the network, and since they may be provided as distinct functional modules, they may reside on different pieces of hardware. If in portions, some or all of the resource adapters 104 may be embedded with hardware, such as on a client device in the form of embedded software or firmware within a mobile communications handset. In addition, other resource adapters 104 may be implemented in software running on general purpose computing and/or network devices. Accordingly, any or all of the resource adapters 104 may be implemented with software, firmware, or hardware modules, depending on the design of the communication network. Moreover, there need not be a one-to-one relationship between network applications 102 and the resource adapters 104. A set of resource adapters 104 may be associated with multiple network applications 102 just as multiple resource adapters 104 may be provided for a single network application. A further description of embodiments of the resource adapters 104 is provided in U.S. patent application Ser. No. 11/739,023, which is incorporated by reference in its entirety herein.

On a functional level, the resource adapters 104 associated with a particular network application enable the communication of data between the network application and the address resolution system 100. With a particular network application, the data and content are encoded in an application-specific addressing mechanism and/or provided in other application-specific data formats. For example, a particular network application registers its application routing rules, such as address types the network application supports, when communicating with the system 100 via the resource adapters 104. The resource adapters 104 extract the data, tag the data with any relevant information about the data, and provide the data to the shared resources data stores 110. The data provided to the shared resources data stores 110 may comprise content used by the network application (such as a file attachment to an email) and/or metadata about the content (such as a destination address for the email). The shared resources data stores 110 may be stored in a data repository that includes a shared memory, or the shared resources data stores 110 can be implemented by establishing a path to where the shared resources data stores 110 can be found.

In one embodiment, the routing rules registered by network applications during their communications with the address resolution system 100 are combined by the resource mapping module 300 and provided to the context engine 200 for address resolution. To facilitate the address resolution processing, in one embodiment, the context engine 200 may store a local copy of the combined routing rules inside the engine. An exemplary combined routing rules repository may include the following data:

Email: username@somecompany.com
IM (XMPP): username_somecompany.com
PTN: 703-123-xxxx
PBX: 703-123-xxxx
Voice mail: 703-123-xxxx
IM (proprietary): None provided
SMS: None provided.

The data provided to the shared resources data stores 110 may comprise generic contextual rules and policies that may affect the address resolution or routing of the incoming request service. These generic contextual rules, in one embodiment, are established by system administrators or authorized users of a particular network application. For example, a context rule may say: "do not allow telephone call to conference room phones during meetings." Another context rule says: "when an employee of somecompany.com is in meeting, forward telephone calls to voice mail and send a text summary of the call." These generic contextual rules may be discretized by specific user information. For example, the scheduling information generated by the calendar application 112 in the shared data stores 110 may contain specific scheduling information regarding a specific user named John Doe as (generic scheduling information) Conference Room 7A: meeting 1:00 PM-3:00 PM, every Tuesday;
(specific scheduling information) Doe, John: conference room 7A, meeting 1:00 PM-3:00 PM, every Tuesday.

The corresponding user information about John Doe in the enterprise user directory 114 of the shared data stores 110 may include the following entries:

Last Name: Doe
First Name: John
Work Phone: 703-123-2345
Email: jdoe@somecompany.com
IM: Skype, jdoe_somecompany
Cell Phone: 703-987-6543
SMS: 7039876543@cellcompany.com.

In one embodiment, the resource adapters 104 are designed to support the full capabilities of their associated network applications to extract as much data as possible therefrom. The resource adapters 104 may therefore be designed not in view of existing needs, but with a view towards to additional data that might be required for interoperation with potential future network applications and enhancements. As a result, the resource adapters 104 may adapt to changing system configurations so that they need not be redesigned as new functionalities and network applications emerge. In addition to keeping the system up to date, this facilitates the development of enhanced functionalities by third parties, which may desire to use data from a particular network application not originally envisioned by the developers of the resource adapters 104.

Network Implementation of Address Resolution System

Figure 2:
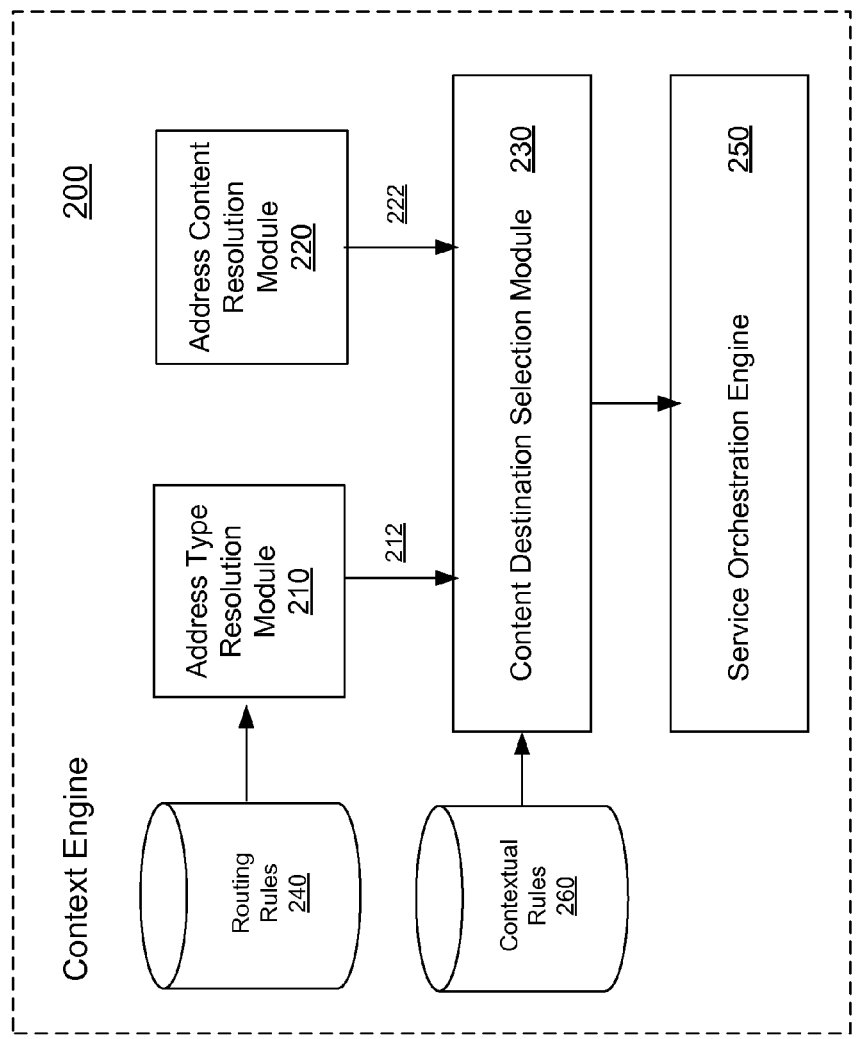
FIG. 2 illustrates functional blocks within a context engine, in accordance with an embodiment of the invention.

FIG. 2 illustrates functional blocks within a context engine 200, in accordance with an embodiment of the invention. In the embodiment illustrated in FIG. 2, the context engine 200 includes an address type resolution module 210, an address content resolution module 220, a content destination selection module 230, a service orchestration engine 250, a routing rules repository 240 and a contextual rules repository 260. The context engine 200 resolves and routes incoming service requests from their originating network applications.

The following description focuses on the scenario where there are no application mapping templates available to resolve the addressing of the incoming service requests. To resolve the address of an incoming service request, the context engine 200 queries shared data stores 110 to search for records that match the destination address (address type and address content) of the originating network application. The context engine 200 further compares the addressing data (i.e., addressing type and addressing content) of the originating network application against the combined routing rules repository 240 and/or enterprise user directory 114. The resulting list of routable network applications is further checked against contextual rules and policies repository 260. The content destination selection module 230 selects one or more destination network applications among the list of routable network applications. The service orchestration engine 250 creates an application template that describes the end-to-end application mapping and converts the application mapping template into a platform logic suitable for the application switching engine 302 to fulfill the incoming service request.

As described above, a resource adapter 140 that receives an incoming service request extracts content and metadata from the originating networking application. The resource adapter 140 passes any unresolved addressing data including any metadata to the context engine 200 for address resolution. In one embodiment, the address type resolution module 210 and the address content resolution module 220 process the unresolved addressing data in parallel. Other embodiments may sequentially process the unresolved addressing data by the address type module 210 and content module 220.

In the processing performed by the address type resolution module 210, the address type of the incoming service request is matched against the routing rules 240 that have been registered by all network applications that have communicated with the resolution system 100. The result of the processing is either no routable network applications found or a list of routable network applications whose address type matches the destination address type specified by the metadata of the incoming service request.

In the processing performed by the address content resolution module 220, the address content of the incoming service request is searched in an user identification (ID)/address data stores of the network applications, such as the enterprise user directory 114 of the shared data stores 110 accessed through the resource adapter 104k in FIG. 1. The result of such processing is either no routable network applications found or a list of routable network applications whose address content matches the destination address content specified by the metadata of the incoming service request. In one embodiment, searching the enterprise user directory 114 can use standard data crawlers and indexing techniques for efficiency.

The content destination selection module 230 receives the results from the address type resolution module 210 and the address content resolution module 220 and selects one or more appropriate destination network applications. If no routable applications are found by the resolution modules 210 and/or 220, the content destination selection module 230 returns an error message to the originating network application indicating the service request not being fulfilled. If one routable application is found by the resolution modules 210 and 220, the selection module 230 selects that application as the destination network application and passes the selection to the service orchestration engine 250 for further processing. If multiple routable applications are found by the resolution modules 210 and 220, the selection module 230 checks the contextual rules and policies stored in the contextual rules repository 260 to select the appropriate destination application and pass that destination to the service orchestration engine 250 for further processing.

Figure 6:
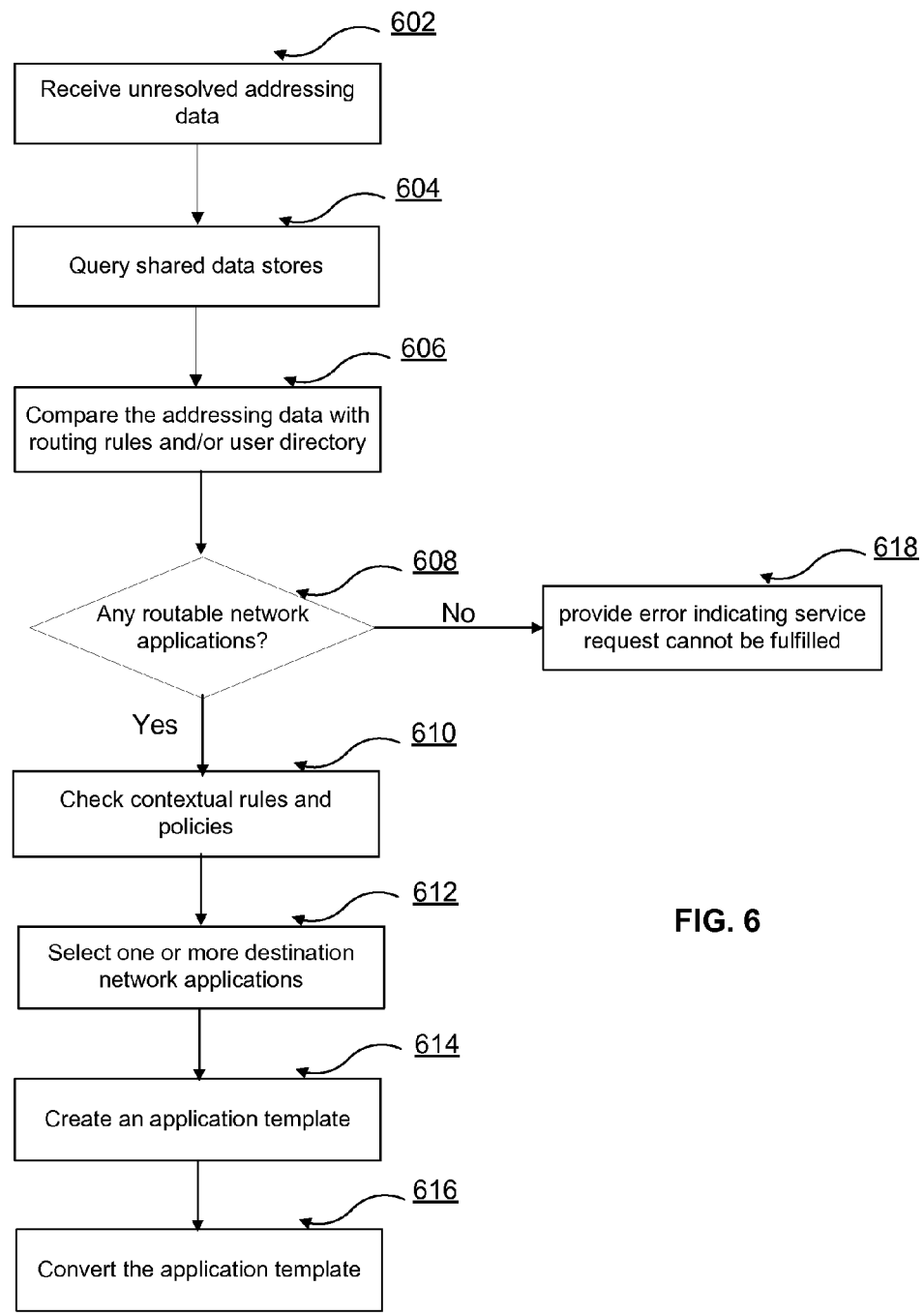
FIG. 6 is a process flow of using a context engine for address resolution, in accordance with an embodiment of the invention.

To describe further the functionality of an embodiment of the context engine 200 described in FIG. 2, FIG. 6 illustrates a process flow of using the context engine 200 for address resolution in accordance with one embodiment of the invention. Initially, the context engine 200 receives 602 the unresolved addressing data (i.e., addressing type and addressing content) of the originating network application from the resource mapping module 300. The context engine 200 quires 604 the shared data stores 110 to search for records that match the destination address (address type and address content) of the originating network application. The context engine 200 further compares 406 the addressing data against the combined routing rules repository 240 and/or enterprise user directory 114. As described above, in one embodiment, the comparison step 406 is performed in parallel by the address type resolution module 210 and by the address content resolution module 220. The context engine 200 checks 608 whether it finds any routable network applications. If the context engine 200 finds a list of routable network applications, the context engine 200 checks 610 the network applications against the contextual rules and policies repository 260. The context engine 200 selects 612 one or more destination network applications among the list of routable network applications by the content destination selection module 230. The service orchestration engine 250 of the context engine 200 creates 614 an applications template that describes the end-to-end application mapping, and converts 616 the application template into a platform logic suitable for the application switching engine 302 to fulfill the incoming service request. If the context engine 200 finds on routable network applications available, the content destination selection module 230 provides 618 an error message to the originating network application indicating the service request not being fulfilled.

Figure 3:
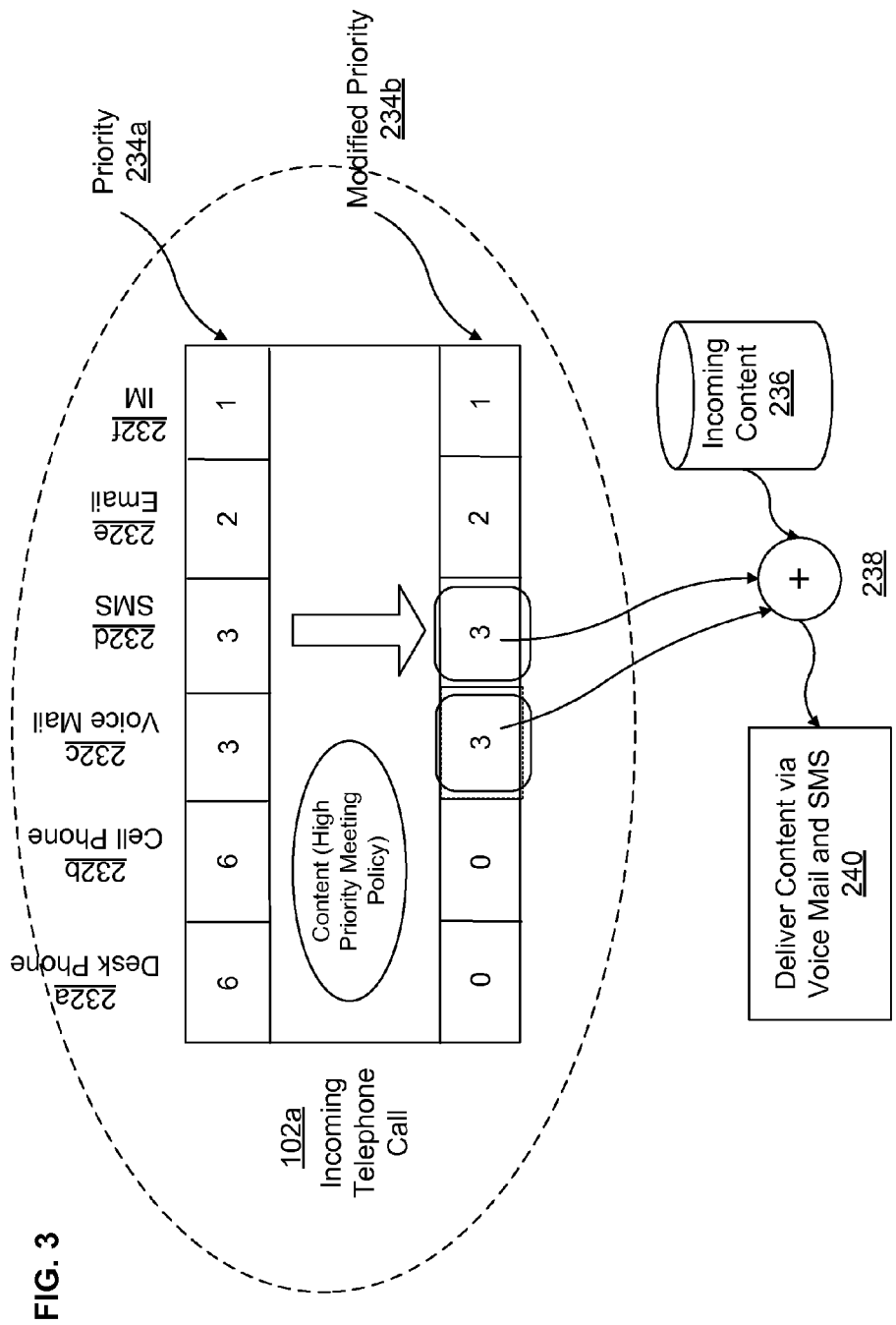
FIG. 3 is a diagram of a content destination selection module, in accordance with an embodiment of the invention.

FIG. 3 is a diagram of a content destination selection module 230, in accordance with an embodiment of the invention. The method of selecting the appropriate destination network applications by the selection module 230 described in FIG. 3 is a decision matrix that uses contextual information to determine the weighting of various options and selects the option (s) with larger weight. In one embodiment, the weight assigned to each routable network application corresponds to its respective priority according to a predetermined ranking criterion, and the weights are assigned by the address type resolution module 210. Other embodiments may assign the weights according other criteria and assigned by system components/modules other than the address type resolution module 210. The context engine 200 may modify the original priority weights 234a and the selection module 230 selects the destination network applications based on the modified priority weights 234b.

In the example illustrated by FIG. 3, the address resolution system 100 receives an incoming telephone call with a destination address from a Public Telephone Network 102a via the resource adapter 104a. The context engine 200 resolves the incoming service request, (e.g., a telephone call from a Public Telephone Network,) first by the address resolution type module 210 for the destination address type data and by the address resolution content module 220 for the destination address content data. The result is a list of routable network applications 232a-f with their associated priority weight 234a. For example, the desk phone 232a and cell phone 232b have the largest priority weight and are the most likely destination network applications, while voice mail 232c and SMS 232d have a smaller priority weight. The context engine 200 consults with the contextual rules and policies repository 260 to resolve any conflicting resource contention or rules/policies violation. Based on the results from the checking, the context engine 200 modifies the original priority weight 234a associated with the network applications 232.

For example, desk phone 232a and cell phone 232b have the lowest priority weights, 0, and voice mail 232c and SMS 232d now become the appropriate destination network applications. The selection module 230 selects the voice mail 232c and SMS 232d as the appropriate destination network applications based the modified priority weight 234b. The selection module 230 passes the selection to the service orchestration engine 250 that combines 238 the address content of the incoming service request 236 and creates the corresponding application mapping template 240, which instructs the resolution system 100 to deliver the incoming telephone call via voice mail and SMS to the specified destination address of the incoming service request.

Figure 4:
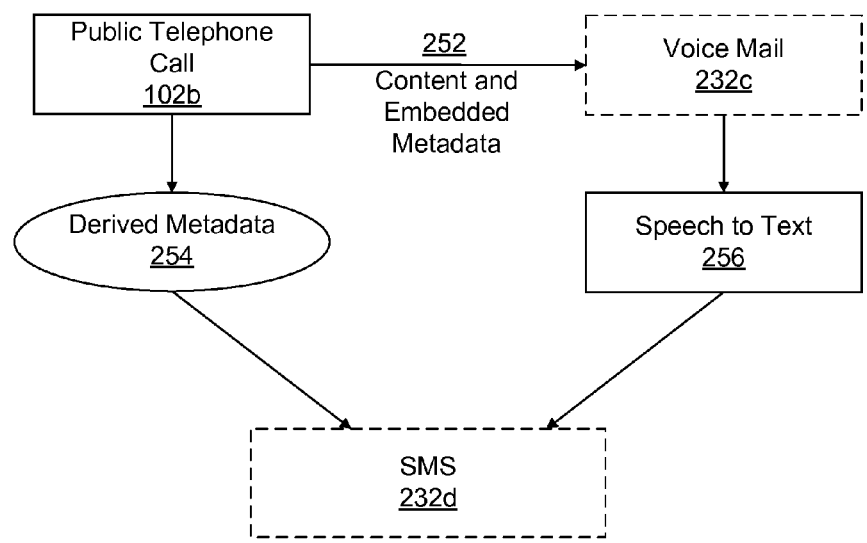
FIG. 4 illustrates a diagram of a service orchestration engine, in accordance with an embodiment of the invention.

FIG. 4 is a diagram of a service orchestration engine 250, in accordance with an embodiment of the invention. In one embodiment, the orchestration engine 250 creates an application mapping template by directly linking the destination addressing data of the incoming service request with the selected destination network application addressing data. For example, routing the incoming telephone call 102a to a voice mail 232c is straightforward since both the destination address type of the incoming service request and the selected destination network application address type are telephone numbers. In other embodiments, the combination 238 of the address content of the incoming service request with the selected destination network applications requires transformation of the metadata and destination address data (address type and content) of the incoming service request to the selected destination network application metadata and addressing mechanism. For example, the context engine also needs to know how to route the telephone call 102a to the SMS text service 232d, whose address type is different from the destination address type of the incoming telephone call. The orchestration engine 250 creates the application mapping template with necessary conversion described above.

In the embodiment illustrated in FIG. 4, the application mapping template directly maps the public telephone call 102b to the voice mail service 232c using the content and metadata 252 provided by the incoming service request without transformation. However, to route the incoming telephone call to the SMS 232d requires the orchestration engine to transform the voice content to the text content required by the SMS 232d application. In this transformation example, the type of the address content of the incoming service request is audio, and the selected destination application content type is text. Thus, the orchestration engine 250 transforms the voice content of the voice mail 232c to text content, and also transforms the metadata provided by the incoming service request to be suitable for the SMS 232d. The derived metadata 254 and text content 256 from the speech-to-text transformation are used by the orchestration engine 250 to finish the application mapping template creation. The diagram illustrated in FIG. 4 shows how the address resolution system 100 combines different applications and transformations in order to deliver an incoming public telephone call to an SMS message. It is noted that no changes are required to any of the communicating network applications that are connected to the resolution system 100. Rather, the system 100 leverages the capabilities of each network application to deliver the required service.

To facilitate the transformation described above, in one embodiment, the service orchestration engine 250 may use a transformation table to check whether the required transformation can be performed. The transformation table can be created offline and gets updated periodically. The following is a transformation table example used by the orchestration engine 250, in accordance with an embodiment of the invention.

TABLE I

Application Mapping Template - Transformation Table

| Type | Input Type | Parameters | Output Type |
|---|---|---|---|
| Speech to test | Audio | Language (default: English); contextual dictionary (optional) | Text |
| Text to speech | Text | Language (default: English) | Audio |
| Text language translation | Audio | Encoding pair (e.g., PCM to AMR) | Audio |
| Text string manipulation | Text | Text manipulations rules (e.g., regular expression as used by UNIX systems) | Text |
| XLST | XML (initial markup) | Style sheet | XML (new markup) |
| Database mapping | Custom (can be any type) | Identify input and output fields | Custom (can be any type) |

Table I lists the types of transformation ("Type") that can be performed, input type of the transformation ("Input Type"), parameters needed for performing the transformation ("Parameters") and the resulting type of the transformation ("Output Type"). For example, a speech-to-text transformation type of transformation is available for the service orchestration engine 250. This transformation transforms an input type of audio to an output type of text using the parameters such as language and optional contextual dictionary.

System Operation

Figure 5:
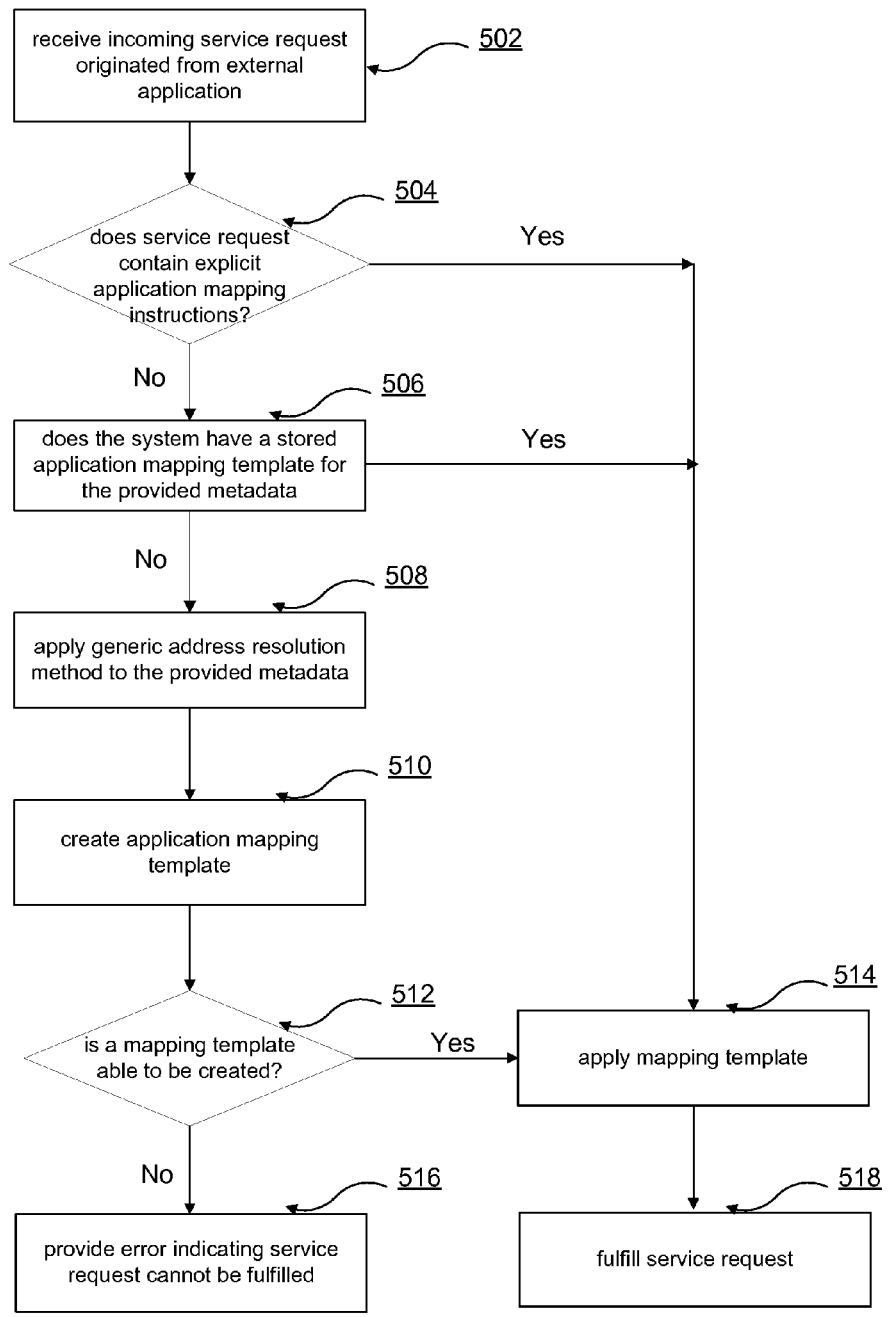
FIG. 5 is a process flow of using address resolution method, in accordance with an embodiment of the invention.

In one embodiment, the generic address resolution system 100 enables users of communication services that employ different network applications to communicate. An example of the process is provided here with reference to the system shown in FIG. 5. Although explained in the context of a data communication from a network application, it can be appreciated that the process can be from a client application and can be destined to another client application or a network application on the same or a different network.

Initially, the address resolution system 100 receives 502 an incoming service request originated from an external network application via a resource adapter 104. The incoming service request has a destination address in a particular address type and has a plurality of associated metadata. The resource adapter 104 extracts the content and metadata from the originating application and stores these data in the shared data stores 110. The resource mapping module 300 checks 504 if the service request contains an explicit application mapping instructions such as an application mapping template. If there are mapping instructions, the application switching engine 302 applies 514 the mapping template and fulfills 518 the service request. If no explicit mapping instructions are provided by the incoming service request, the resource mapping module 300 checks 506 whether the resolution system 100 has a stored application mapping template appropriate for the provided metadata. If no application mapping template is found in the system 100, the resource mapping module 300 passes any unresolved addressing data to the context engine 200 for further processing. The context engine 200 applies 508 the generic address resolution method to the provided metadata and selects the appropriate destination network applications by the content destination selection module 230. The service orchestration engine 250 receives the network application selection from the selection module 230 and creates 510 the application mapping template. If the mapping template is successfully created 512 by the orchestration engine 250, the mapping template is passed to the application switching engine 302 for application 514 and service fulfillment 518. If no mapping template is able to be created 516, the resolution system 100 provides 516 an error message indicating that the service request cannot be fulfilled.

The following is an example to illustrate the generic address resolution method described above. Initially, the generic address resolution system 100 receives a telephone call from the Public Telephone Network 102 through the resource adapter 104a. The resource adapter 104 extract the following metadata from the telephone call:

Address type (i.e., application): public telephone
To: 703-123-2345
From: 1-800-777-7777
Time: 1:33 pm, Tuesday, Mar. 3, 2007.

The resource mapping module 300 checks to find out that there is no embedded application mapping template with the phone call, and there is no appropriate mapping template stored in the system 100 either. The unresolved addressing data is passed to the context engine 200 from the resource mapping module 300 for address resolution. The context engine 200 analyzes the addressing data by the address type resolution module 210 and the address content resolution module 220 in parallel. In the address type analysis, the address type, (e.g., public telephone,) is compared with the address types stored in the routing rules and policies repository 240. Specifically, the metadata (address type) is used to look up network applications that are generically associated with the metadata. In this case, the address type indicates that this is a public telephone call, and the address type resolution module 210 looks for network applications that support public telephone address types. The result of the searching is the following list of routable network applications:

Desk phone (PBX)
Voice mail

Optionally a catch-all collector that collects "unwanted" (i.e., no recipient identified) or extremely low priority communications.

In the parallel address content analysis, the address content, (e.g., 703-123-2345,) is searched by the address content resolution module 220 in the enterprise user directory 114 in the shared data stores 110. The search returns a matching record for "703-123-2345", which associates "John Doe" with the phone number as following:

Last Name: Doe
First Name: John
Work Phone: 703-123-2345
Email: jdoe@somecompany.com
IM: Skype, jdoe_somecompany
Cell Phone: 703-987-6543
SMS: 7039876543@cellcompany.com.

Since multiple network applications, e.g., desk phone (i.e., work phone), cell phone, voice mail, SMS, email and IM, are listed as routable network applications with their associated priority weight, such as the ones illustrated in FIG. 3, the context engine 200 needs to select appropriate network applications based on pertinent context information. The context engine 200 may check the general routing policies associated with the metadata, (e.g., John Doe at 703-123-2345,) in the contextual rules 260 internally and/or scheduling information from the calendar application 112 in the shared data stores 110. In this case, the calendar application 112 reports that John Doe has a high priority meeting from 1:00 pm to 2:00 pm on Mar. 3, 2007. The general routing policies regulates that employees in high priority meetings should not receive communication via services that would be disturbing, such as telephone calls, but non-disruptive services, such as text services, are allowed. Based on the contextual information, the content destination selection module 230 of the context engine 200 modifies the priority weights and selects the appropriate destination network applications. In this case, the selection module 230 selects voice mail and SMS as the destination network applications.

The service orchestration engine 250 of the context engine 200 receives the selections from the selection module 230 and creates the application mapping template. In this case, the embedded metadata (i.e., content and embedded metadata 252 of FIG. 4) is To: 703-123-2345
From: 1-800-777-7777.

The derived metadata (i.e., derived metadata 254 of FIG. 4) is

Address type (i.e., application): public telephone
To: 703-123-2345
From: 1-800-777-7777
Time: 1:33 pm, Tuesday, Mar. 3, 2007.

The orchestration engine 250 generates the application mapping template which describes one mapping from public telephone call to voice mail, i.e., routing the call from 1-800-777-7777 to the voice mail of phone number 703-123-2345. The orchestration engine 250 further transforms the voice mail at 703-123-2345 to the SMS of John Doe, 7039876543@cellcompany.com, using the derived metadata. The context engine 200 sends the above application mapping template to the application switching engine 232 to fulfill the communications between the Public Telephone Network 102a and the Enterprise PBX 102b and the SMS 102d.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A computer-implemented method for routing a source network application in a communications network, the method comprising:
    receiving a transmission from the source network application, the transmission comprising content and metadata, the metadata including a destination address for the transmission;
    retrieving a set of contextual rules from a resource repository, the set of contextual rules describing modularized components extracted from received network applications;
    identifying one or more candidate destination network applications based on at least one of the metadata of the transmission and the set of contextual rules, each identified candidate destination network application having an initial priority weight, a larger priority weight indicating a higher likelihood of being selected as the destination network application for routing the source network application;
    dynamically adjusting the initial priority weights associated with the candidate destination network applications based on at least one of the metadata of the transmission and the set of contextual rules;
    selecting at least one destination network application from the candidate destination network applications based at least in part on the adjusted priority weights and a determination of whether the transmission requires a transformation;
    creating an application mapping template based on at least one selected destination network application with the largest adjusted priority weight, wherein the application mapping template contains instructions to route the source network application to the selected destination network application;
    transforming the transmission from the source network application according to the instructions contained in the application mapping template; and
    routing the transformed transmission to the at least one selected destination network application.

2. The method of claim 1, wherein the one or more candidate destination network applications are identified based on the destination address of the transmission, and each candidate destination network application has a destination address that is compatible with the destination address of the transmission.

3. The method of claim 1, wherein a priority weight of a candidate destination network application indicates a degree of compatibility between the destination address of the candidate destination network application and the destination address of the transmission.

4. The method of claim 3, wherein the priority weight of a candidate destination network application is generated using contextual information about the communications network.

5. The method of claim 4, wherein generating the initial priority weights of the candidate destination network applications comprises assigning a weight to each of the candidate destination network applications according to a predetermined ranking criterion.

6. The method of claim 1, wherein dynamically adjusting the initial priority weight associated with a candidate destination network application comprises setting the initial priority weight to a weight smaller than the initial priority weight based at least in part on the set of contextual rules applied to context information of the communications network.

7. The method of claim 1, wherein dynamically adjusting the initial priority weight associated with a candidate destination network application further comprises setting the initial priority weight to a weight larger than the initial priority weight based at least in part on the set of contextual rules applied to context information of the communications network.

8. The method of claim 1, wherein transforming the transmission from the source network application comprises:
    transforming the source network application into a first destination network application; and
    transforming the first destination network application into a second destination network application, the first destination network application and the second destination network application being selected based on the instructions contained in the application mapping template.

9. A computer system for routing a source network application in a communications network, the system comprising:
    a computer processor configured to execute modules, the modules comprising:
        a resource mapping module configured to receive a transmission from the source network application, the transmission comprising content and metadata, the metadata including a destination address for the transmission;
        a context engine configured to:
            retrieve a set of contextual rules from a resource repository, the set of contextual rules describing modularized components extracted from received network applications;
            identify one or more candidate destination network applications based on at least one of the metadata of the transmission and the set of contextual rules, each identified candidate destination network application having an initial priority weight, a larger priority weight indicating a higher likelihood of being selected as the destination network application for routing the source network application;
        a content destination selection module configured to:
            dynamically adjust the initial priority weights associated with the candidate destination network applications based on at least one of the metadata of the transmission and the set of contextual rules;
            select at least one destination network application from the candidate destination network applications based at least in part on the adjusted priority weights and a determination of whether the transmission requires a transformation; and
        an application switching engine configured to:
            create an application mapping template based on at least one selected destination network application with the largest adjusted priority weight, wherein the application mapping template contains instructions to route the source network application to the selected destination network application;
    transform the transmission from the source network application according to the instructions contained in the application mapping template; and
    route the transformed transmission to the at least one selected destination network application.

10. The system of claim 9, wherein the one or more candidate destination network applications are identified based on the destination address of the transmission, and each candidate destination network application has a destination address that is compatible with the destination address of the transmission.

11. The system of claim 9, wherein a priority weight of a candidate destination network application indicates a degree of compatibility between the destination address of the candidate destination network application and the destination address of the transmission.

12. The system of claim 11, wherein the priority weight of a candidate destination network application is generated using contextual information about the communications network.

13. The system of claim 12, wherein generating the initial priority weights of the candidate destination network applications comprises assigning a weight to each of the candidate destination network applications according to a predetermined ranking criterion.

14. The system of claim 9, wherein the content destination selection module is further configured to the initial priority weight to a weight larger than the initial priority weight based at least in part on the set of contextual rules applied to context information of the communications network.

15. The system of claim 9, wherein the application switching engine is further configured to:
    transform the source network application into a first destination network application; and
    transform the first destination network application into a second destination network application, the first destination network application and the second destination network application being selected based on the instructions contained in the application mapping template.

16. A non-transitory computer-readable storage medium storing executable computer program code for routing a source network application in a communications network, the computer program code comprising instructions for:
    receiving a transmission from the source network application, the transmission comprising content and metadata, the metadata including a destination address for the transmission;
    retrieving a set of contextual rules from a resource repository, the set of contextual rules describing modularized components extracted from received network applications;
    identifying one or more candidate destination network applications based on at least one of the metadata of the transmission and the set of contextual rules, each identified candidate destination network application having an initial priority weight, a larger priority weight indicating a higher likelihood of being selected as the destination network application for routing the source network application;
    dynamically adjusting the initial priority weights associated with the candidate destination network applications based on at least one of the metadata of the transmission and the set of contextual rules;
    selecting at least one destination network application from the candidate destination network applications based at least in part on the adjusted priority weights and a determination of whether the transmission requires a transformation;
    creating an application mapping template based on at least one selected destination network application with the largest adjusted priority weight, wherein the application mapping template contains instructions to route the source network application to the selected destination network application;
    transforming the transmission from the source network application according to the instructions contained in the application mapping template; and
    routing the transformed transmission to the at least one selected destination network application.

17. The computer-readable storage medium of claim 16, wherein the one or more candidate destination network applications are identified based on the destination address of the transmission, and each candidate destination network application has a destination address that is compatible with the destination address of the transmission.

18. The computer-readable storage medium of claim 16, wherein a priority weight of a candidate destination network application indicates a degree of compatibility between the destination address of the candidate destination network application and the destination address of the transmission.

19. The computer-readable storage medium of claim 16, wherein the computer program instructions for dynamically adjusting the initial priority weight associated with a candidate destination network application comprise computer program instructions for setting the initial priority weight to a weight smaller than the initial priority weight based at least in part on the set of contextual rules applied to context information of the communications network.

20. The computer-readable storage medium of claim 16, wherein the computer program instruction for transforming the transmission from the source network application comprise computer program instructions for:
    transforming the source network application into a first destination network application; and
    transforming the first destination network application into a second destination network application, the first destination network application and the second destination network application being selected based on the instructions contained in the application mapping template.

\* \* \* \* \*